US012730615B2

(12) United States Patent
Strenge et al.

(10) Patent No.: US 12,730,615 B2
(45) Date of Patent: Sep. 8, 2026

(54) SYSTEM AND METHOD FOR EXTENDING AN APPLICATION WITH USER-DEFINED CONTENT

(71) Applicant: Kinaxis Inc., Ottawa (CA)

(72) Inventors: Dave Strenge, Ottawa (CA); Ryan McCluskey, Ottawa (CA); Graham Andrews, Ottawa (CA)

(73) Assignee: Kinaxis, Inc., Ottawa (CA)

( * ) Notice: Subject to any disclaimer, the term of this patent is extended or adjusted under 35 U.S.C. 154(b) by 426 days.

(21) Appl. No.: 18/356,623

(22) Filed: Jul. 21, 2023

(65) Prior Publication Data

US 2024/0028428 A1 Jan. 25, 2024

Related U.S. Application Data

(60) Provisional application No. 63/391,175, filed on Jul. 21, 2022.

(51) Int. Cl.
*G06F 8/30* (2018.01)
*G06F 8/38* (2018.01)
*G06F 9/54* (2006.01)

(52) U.S. Cl.
CPC ................ *G06F 8/38* (2013.01); *G06F 8/315* (2013.01); *G06F 9/542* (2013.01)

(58) Field of Classification Search
CPC . G06F 8/38; G06F 8/315; G06F 9/542; G06F 8/36
USPC .......................................................... 319/318
See application file for complete search history.

(56) References Cited

U.S. PATENT DOCUMENTS

| | | | | |
|---|---|---|---|---|
| 8,561,028 | B1 | 10/2013 | Zuckerman | |
| 9,396,234 | B2 | 7/2016 | Lynch et al. | |
| 9,916,475 | B2 | 3/2018 | Enck et al. | |
| 10,013,400 | B1 | 7/2018 | Zetlen | |
| 10,162,607 | B2 | 12/2018 | Callahan et al. | |
| 10,331,420 | B2 | 6/2019 | Nagar | |
| 10,747,942 | B1 | 8/2020 | Siroker | |
| 11,875,104 | B2 | 1/2024 | Abrahami | |
| 2010/0228602 | A1 * | 9/2010 | Gilvar | G06Q 30/0252 705/14.5 |
| 2012/0004950 | A1 * | 1/2012 | Julian | G06Q 10/02 705/7.32 |
| 2012/0192155 | A1 | 7/2012 | Silbey et al. | |
| 2013/0198607 | A1 * | 8/2013 | Mischook | G06F 16/9577 715/234 |
| 2013/0304523 | A1 * | 11/2013 | Tobin, Jr. | G06Q 10/02 705/5 |
| 2014/0279060 | A1 * | 9/2014 | Memarian | G06Q 30/0276 705/14.72 |

(Continued)

FOREIGN PATENT DOCUMENTS

| | | |
|---|---|---|
| CN | 112363794 A | 2/2021 |
| CN | 113190214 A | 7/2021 |

OTHER PUBLICATIONS

Linkola, Lasse. "Design and implementation of modular frontend architecture on existing application." Information Technology (2021).

*Primary Examiner* — Tuan C Dao
(74) *Attorney, Agent, or Firm* — Ruggiero McAllister & McMahon LLC

(57) ABSTRACT

Methods and systems that provide the tools and flexibility to build views that meet a user's needs by eliminating arbitrary limitations that are imposed by entrenched resource concepts that currently exist.

24 Claims, 7 Drawing Sheets

(56) References Cited

U.S. PATENT DOCUMENTS

| | | | | |
|---|---|---|---|---|
| 2017/0131874 | A1* | 5/2017 | Redenbach | G06F 3/04815 |
| 2017/0235470 | A1* | 8/2017 | Baluja | G05B 19/0426 715/735 |
| 2017/0262294 | A1* | 9/2017 | Yakan | G06K 7/1413 |
| 2017/0329579 | A1 | 11/2017 | Laethem et al. | |
| 2017/0357716 | A1* | 12/2017 | Bellegarda | G06F 16/345 |
| 2017/0374130 | A1* | 12/2017 | AbiEzzi | G06F 9/45533 |
| 2018/0088915 | A1 | 3/2018 | Yang | |
| 2019/0005228 | A1 | 1/2019 | Singh et al. | |
| 2019/0155581 | A1 | 5/2019 | Callahan et al. | |
| 2019/0324986 | A1* | 10/2019 | Schwartz | G06F 3/0483 |
| 2019/0332359 | A1 | 10/2019 | Laethem et al. | |
| 2020/0057714 | A1 | 2/2020 | Ounce | |
| 2020/0183761 | A1* | 6/2020 | Roy | H04L 63/145 |
| 2021/0034225 | A1* | 2/2021 | Harazi | G06F 3/0482 |
| 2021/0297495 | A1 | 9/2021 | Cambell et al. | |
| 2021/0358460 | A1* | 11/2021 | Wirtz | G10H 1/0016 |
| 2022/0334857 | A1* | 10/2022 | Lam | G06F 9/44521 |
| 2022/0337536 | A1* | 10/2022 | Meersma | H04L 51/224 |
| 2022/0413843 | A1 | 12/2022 | Agarwal et al. | |
| 2023/0004637 | A1* | 1/2023 | Wang | G06F 21/53 |
| 2023/0086308 | A1 | 3/2023 | Lim et al. | |

* cited by examiner

START 402

RETRIEVE CONTEXT DEFINITION 404

CREATE EXECUTION ENGINE 406

APPLY HTML LAYOUT 408

GENERATE COMPONENTS 410

ADDRESS CONTEXT 412

DISPLAY CANVAS 414

GENERATE DATA SOURCES 416

ADDRESS EVENTS 418

DISPOSE CANVAS 420

END 422

SYSTEM AND METHOD FOR EXTENDING AN APPLICATION WITH USER-DEFINED CONTENT

The present application claims the benefit of U.S. Provisional Patent Application No. 63/391,175 filed Jul. 21, 2022, which is hereby incorporated by reference.

BACKGROUND

An application that is highly configurable often lacks flexibility due to entrenched limitations, thereby not allowing a user to write their own custom logic or customized view.

There is therefore a need for systems and methods that allow a user to build views and/or write custom logic without compromising the security of a host application.

BRIEF SUMMARY

Disclosed herein are methods and systems that provide the tools and flexibility to build views that meet a user's needs by eliminating arbitrary limitations that are imposed by entrenched resource concepts that currently exist.

Such a system can comprise: a user side framework to render a view at runtime; a user side authoring environment to assemble and configure the view; a user side JavaScript library to expose a server API to Canvas JavaScript scripts; a securely integrated user side JavaScript Engine to interpret user side JavaScript scripts; a component library to assemble the view; an event bus to exchange information with the canvas and hosting application or between canvas components; and a server to perform server side validation and provide an API that persists the definition in a data store.

The term "Canvas" can be defined as comprising the following elements: a layout definition; one or more component definitions; state information; one or more server side expressions; one or more event handler definitions; and one or more data source references.

For example, a supply chain planning application that incorporates concurrent planning is a highly configurable application. In such an application, the concept of a resource has been introduced in such a manner that does not allow for a great deal of flexibility. Systems and methods disclosed herein can build a view that mixes the capabilities of well-established resource concepts—for example, allowing for embedding elements of a scorecard in a dashboard. By managing various components individually and ensuring a clear separation of concerns, a Canvas is able to support a super set of the capabilities that exist across resources supply chain planning applications that incorporate concurrent planning. Additionally, an event framework that is implemented, allows for a highly interactive application to be developed where data can be exchanged with the hosting application, and between components.

In one aspect, a computer-implemented method includes: retrieving, by a processor, a definition of a Context; creating, by the processor, an execution engine; applying, by the processor, an HTML layout; generating, by the processor, one or more components; addressing, by the processor, the Context; displaying, by the processor, a canvas; generating, by the processor, one or more data sources; addressing, by the processor, one or move events from a host; and disposing, by the processor, the canvas.

In the computer-implemented method, addressing the Context may also include handling, by the processor, a Context event associated with the Context.

In the computer-implemented method, the one or more events may comprise: an exhibition event, an API-Client response, or a close event.

In the computer-implemented method, where the one or more events is the exhibition event, addressing the one or more events may include: executing, by the processor, a component handler for the exhibition event; updating, by the processor, a state; notifying, by the processor, each component listening to the state that the state has been updated; where there is no error, sending, by the processor, the exhibition event and the updated state to the host; and where there is an error, disposing, by the processor, the canvas.

In the computer-implemented method, where the one or more events is the API Client Response, addressing the one or more events may include: updating, by the processor, a state; notifying, by the processor, each component listening to the state that the state has been updated; where there is no error, sending, by the processor, the exhibition event and the updated state to the host; and where there is an error, disposing, by the processor, the canvas.

In the computer-implemented method, where the one or more events is the close event, addressing the one or more events may include: disposing, by the processor, the canvas. Other technical features may be readily apparent to one skilled in the art from the following figures, descriptions, and claims.

In one aspect, a computing apparatus includes a processor. The computing apparatus also includes a memory storing instructions that, when executed by the processor, configure the apparatus to: retrieve, by the processor, a definition of a Context; create, by the processor, an execution engine; apply, by the processor, an HTML layout; generate, by the processor, one or more components; address, by the processor, the Context; display, by the processor, a canvas; generate, by the processor, one or more data sources; address, by the processor, one or move events from a host; and dispose, by the processor, the canvas.

In the context of the computing apparatus, the one or more events may comprise: an exhibition event, an API-Client response, or a close event.

In the context of the computing apparatus, where the one or more events is the exhibition event, and when addressing the one or more events, the apparatus may be further configured to: execute, by the processor, a component handler for the exhibition event; update, by the processor, a state; notify, by the processor, each component listening to the state that the state has been updated; where there is no error, send, by the processor, the exhibition event and the updated state to the host; and where there is an error, dispose, by the processor, the canvas.

In the context of the computing apparatus, where the one or more events is the API Client Response, and when addressing the one or more events, the apparatus may be further configured to: update, by the processor, a state; notify, by the processor, each component listening to the state that the state has been updated; where there is no error, send, by the processor, the exhibition event and the updated state to the host; and where there is an error, dispose, by the processor, the canvas.

In the context of the computing apparatus, where the one or more events is the close event, and when addressing the one or more events, the apparatus may be further configured to: dispose, by the processor, the canvas. Other technical features may be readily apparent to one skilled in the art from the following figures, descriptions, and claims.

In one aspect, a non-transitory computer-readable storage medium is provided, the computer-readable storage medium including instructions that when executed by a computer, cause the computer: to retrieve, by a processor, a definition of a Context; create, by the processor, an execution engine; apply, by the processor, an HTML layout; generate, by the processor, one or more components; address, by the processor, the Context; display, by the processor, a canvas; generate, by the processor, one or more data sources; address, by the processor, one or move events from a host; and dispose, by the processor, the canvas.

The non-transitory computer-readable storage medium may also include instructions that when executed by a computer, cause the computer to include as part of addressing the Context, handle, by the processor, a Context event associated with the Context.

In the context of the computer-readable storage medium, the one or more events may comprise: an exhibition event, an API-Client response, or a close event.

Where the one or more events comprises the exhibition event, and when addressing the one or more events, the computer-readable storage medium may include instructions that when executed by the computer, further cause the computer to: execute, by the processor, a component handler for the exhibition event; update, by the processor, a state; notify, by the processor, each component listening to the state that the state has been updated; where there is no error, send, by the processor, the exhibition event and the updated state to the host; and where there is an error, dispose, by the processor, the canvas.

Where the one or more events comprises the API Client Response, and when addressing the one or more events, the computer-readable storage medium may include instructions that when executed by the computer, further cause the computer to: update, by the processor, a state; notify, by the processor, each component listening to the state that the state has been updated; where there is no error, send, by the processor, the exhibition event and the updated state to the host; and where there is an error, dispose, by the processor, the canvas.

Where the one or more events comprises the close event, and when addressing the one or more events, the computer-readable storage medium may include instructions that when executed by the computer, further cause the computer to dispose, by the processor, the canvas. Other technical features may be readily apparent to one skilled in the art from the following figures, descriptions, and claims.

The canvas can include a layout definition, one or more component definitions, state information, one or more server side expressions, one or more event handler definitions, and one or more data source references.

The execution engine can be a JavaScript Engine, and the one or more components can be React Components.

The details of one or more embodiments of the subject matter of this specification are set forth in the accompanying drawings and the description below. Other features, aspects, and advantages of the subject matter will become apparent from the description, the drawings, and the claims.

Other technical features may be readily apparent to one skilled in the art from the following figures, descriptions, and claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
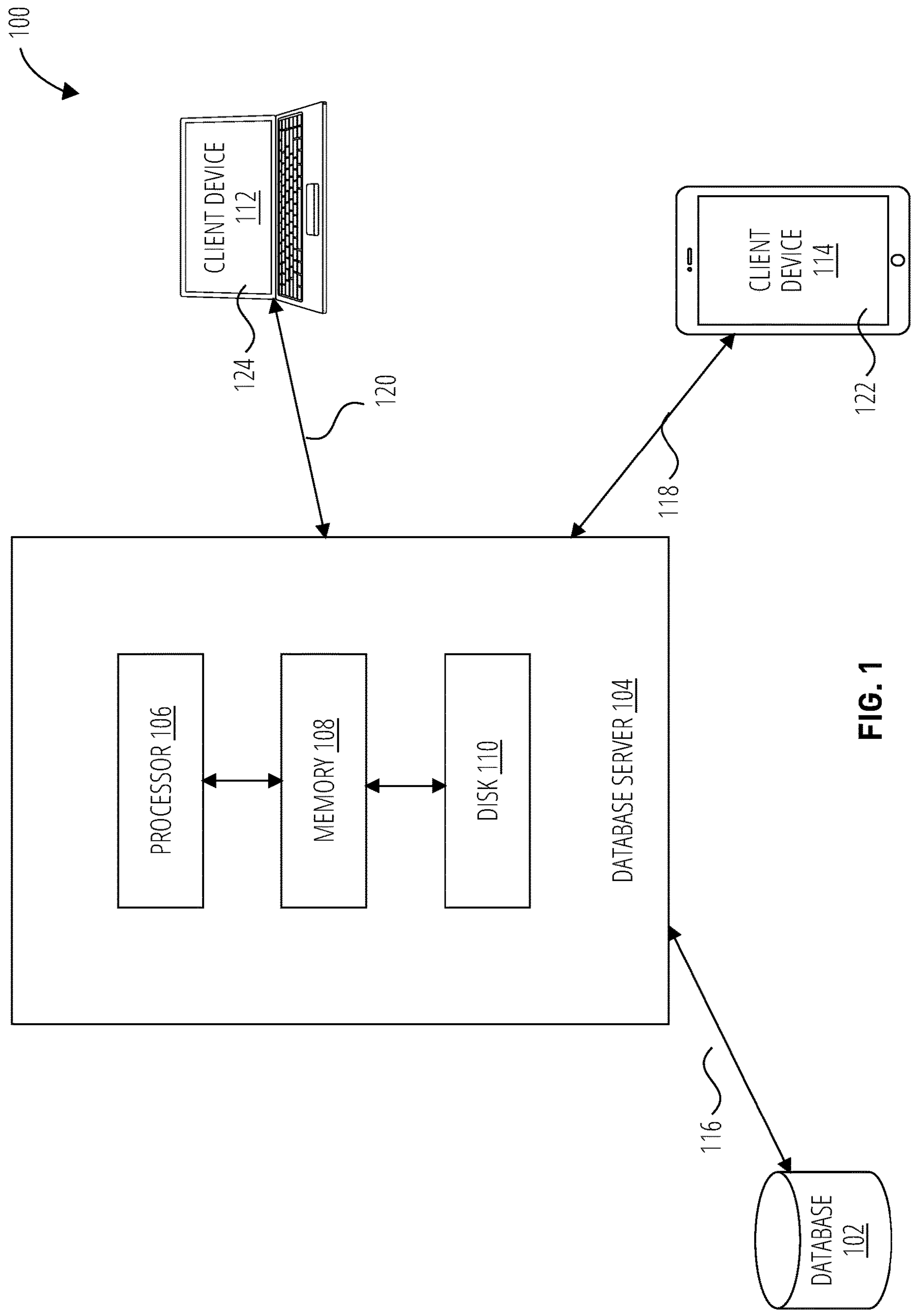
FIG. 1 illustrates an example of a system for extending an application with user-defined content in accordance with one embodiment.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage media having computer readable program code embodied thereon.

Many of the functional units described in this specification have been labeled as modules, in order to emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable storage media.

Any combination of one or more computer readable storage media may be utilized. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium can include the following: a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a Blu-ray disc, an optical storage device, a magnetic tape, a Bernoulli drive, a magnetic disk, a magnetic storage device, a punch card, integrated circuits, other digital processing apparatus memory devices, or any suitable combination of the foregoing, but would not include propagating signals. In the Context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Python, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the disclosure may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. However, the disclosure may be practiced without one or more of the specific details, or with other methods, components, materials, and so forth. In other instances, well-known structures, materials, or operations are not shown or described in detail to avoid obscuring aspects of the disclosure.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the schematic flowchart diagrams and/or schematic block diagrams block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

The description of elements in each figure may refer to elements of proceeding figures. Like numbers refer to like elements in all figures, including alternate embodiments of like elements.

A computer program (which may also be referred to or described as a software application, code, a program, a script, software, a module or a software module) can be written in any form of programming language. This includes compiled or interpreted languages, or declarative or procedural languages. A computer program can be deployed in many forms, including as a module, a subroutine, a stand-alone program, a component, or other unit suitable for use in a computing environment. A computer program can be deployed to be executed on one computer or can be deployed on multiple computers that are located at one site or distributed across multiple sites and interconnected by a communication network.

As used herein, a "software engine" or an "engine," refers to a software implemented system that provides an output that is different from the input. An engine can be an encoded block of functionality, such as a platform, a library, an object or a software development kit ("SDK"). Each engine can be implemented on any type of computing device that includes one or more processors and computer readable media. Furthermore, two or more of the engines may be implemented on the same computing device, or on different computing devices. Non-limiting examples of a computing device include tablet computers, servers, laptop or desktop computers, music players, mobile phones, e-book readers, notebook computers, PDAs, smart phones, or other stationary or portable devices.

The processes and logic flows described herein can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows that can be performed by an apparatus, can also be implemented as a graphics processing unit (GPU).

Computers suitable for the execution of a computer program include, by way of example, general or special purpose microprocessors or both, or any other kind of central processing unit. Generally, a central processing unit receives instructions and data from a read-only memory or a random access memory or both. A computer can also include, or be operatively coupled to receive data from, or transfer data to, or both, one or more mass storage devices for storing data, e.g., optical disks, magnetic, or magneto optical disks. It should be noted that a computer does not require these devices. Furthermore, a computer can be embedded in another device. Non-limiting examples of the latter include a game console, a mobile telephone a mobile audio player, a personal digital assistant (PDA), a video player, a Global Positioning System (GPS) receiver, or a portable storage device. A non-limiting example of a storage device include a universal serial bus (USB) flash drive.

Computer readable media suitable for storing computer program instructions and data include all forms of non-volatile memory, media and memory devices; non-limiting examples include magneto optical disks; semiconductor memory devices (e.g., EPROM, EEPROM, and flash memory devices); CD ROM disks; magnetic disks (e.g., internal hard disks or removable disks); and DVD-ROM disks. The processor and the memory can be supplemented by, or incorporated in, special purpose logic circuitry.

To provide for interaction with a user, embodiments of the subject matter described herein can be implemented on a computer having a display device for displaying information to the user and input devices by which the user can provide input to the computer (for example, a keyboard, a pointing device such as a mouse or a trackball, etc.). Other kinds of devices can be used to provide for interaction with a user. Feedback provided to the user can include sensory feedback (e.g., visual feedback, auditory feedback, or tactile feedback). Input from the user can be received in any form, including acoustic, speech, or tactile input. Furthermore, there can be interaction between a user and a computer by way of exchange of documents between the computer and a device used by the user. As an example, a computer can send web pages to a web browser on a user's client device in response to requests received from the web browser.

Embodiments of the subject matter described in this specification can be implemented in a computing system that includes: a front end component (e.g., a client computer having a graphical user interface or a Web browser through which a user can interact with an implementation of the subject matter described herein); or a middleware component (e.g., an application server); or a back end component (e.g. a data server); or any combination of one or more such back end, middleware, or front end components. The components of the system can be interconnected by any form or medium of digital data communication, e.g., a communication network. Non-limiting examples of communication networks include a local area network ("LAN") and a wide area network ("WAN").

The computing system can include clients and servers. A client and server are generally remote from each other and typically interact through a communication network. The relationship of client and server arises by virtue of computer programs running on the respective computers and having a client-server relationship to each other.

FIG. 1 illustrates an example of a system 100 for extending an application with user-defined content.

System 100 includes a database server 104, a database 102, and client devices 112 and 114. Database server 104 can include a memory 108, a disk 110, and one or more processors 106. In some embodiments, memory 108 can be volatile memory, compared with disk 110 which can be non-volatile memory. In some embodiments, database server 104 can communicate with database 102 using interface 116. Database 102 can be a versioned database or a database that does not support versioning. While database 102 is illustrated as separate from database server 104, database 102 can also be integrated into database server 104, either as a separate component within database server 104, or as part of at least one of memory 108 and disk 110. A versioned database can refer to a database which provides numerous complete delta-based copies of an entire database. Each complete database copy represents a version. Versioned databases can be used for numerous purposes, including simulation and collaborative decision-making.

System 100 can also include additional features and/or functionality. For example, system 100 can also include additional storage (removable and/or non-removable) including, but not limited to, magnetic or optical disks or tape. Such additional storage is illustrated in FIG. 1 by memory 108 and disk 110. Storage media can include volatile and nonvolatile, removable and non-removable media implemented in any method or technology for storage of information such as computer-readable instructions, data structures, program modules or other data. Memory 108 and disk 110 are examples of non-transitory computer-readable storage media. Non-transitory computer-readable media also includes, but is not limited to, Random Access Memory (RAM), Read-Only Memory (ROM), Electrically Erasable Programmable Read-Only Memory (EEPROM), flash memory and/or other memory technology, Compact Disc Read-Only Memory (CD-ROM), digital versatile discs (DVD), and/or other optical storage, magnetic cassettes, magnetic tape, magnetic disk storage or other magnetic storage devices, and/or any other medium which can be used to store the desired information and which can be accessed by system 100. Any such non-transitory computer-readable storage media can be part of system 100.

System 100 can also include interfaces 116, 118 and 120. Interfaces 116, 118 and 120 can allow components of system 100 to communicate with each other and with other devices. For example, database server 104 can communicate with database 102 using interface 116. Database server 104 can also communicate with client devices 112 and 114 via interfaces 120 and 118, respectively. Client devices 112 and 114 can be different types of client devices; for example, client device 112 can be a desktop or laptop, whereas client device 114 can be a mobile device such as a smartphone or tablet with a smaller display. Non-limiting example interfaces 116, 118 and 120 can include wired communication links such as a wired network or direct-wired connection, and wireless communication links such as cellular, radio frequency (RF), infrared and/or other wireless communication links. Interfaces 116, 118 and 120 can allow database server 104 to communicate with client devices 112 and 114 over various network types. Non-limiting example network types can include Fibre Channel, small computer system interface (SCSI), Bluetooth, Ethernet, Wi-fi, Infrared Data Association (IrDA), Local area networks (LAN), Wireless Local area networks (WLAN), wide area networks (WAN) such as the Internet, serial, and universal serial bus (USB). The various network types to which interfaces 116, 118 and 120 can connect can run a plurality of network protocols including, but not limited to Transmission Control Protocol (TCP), Internet Protocol (IP), real-time transport protocol (RTP), realtime transport control protocol (RTCP), file transfer protocol (FTP), and hypertext transfer protocol (HTTP).

Using interface 116, database server 104 can retrieve data from database 102. The retrieved data can be saved in disk 110 or memory 108. In some cases, database server 104 can also comprise a web server, and can format resources into a format suitable to be displayed on a web browser. Database server 104 can then send requested data to client devices 112 and 114 via interfaces 120 and 118, respectively, to be displayed on applications 122 and 124. Applications 122 and 124 can be a web browser or other application running on client devices 112 and 114.

Figure 2:
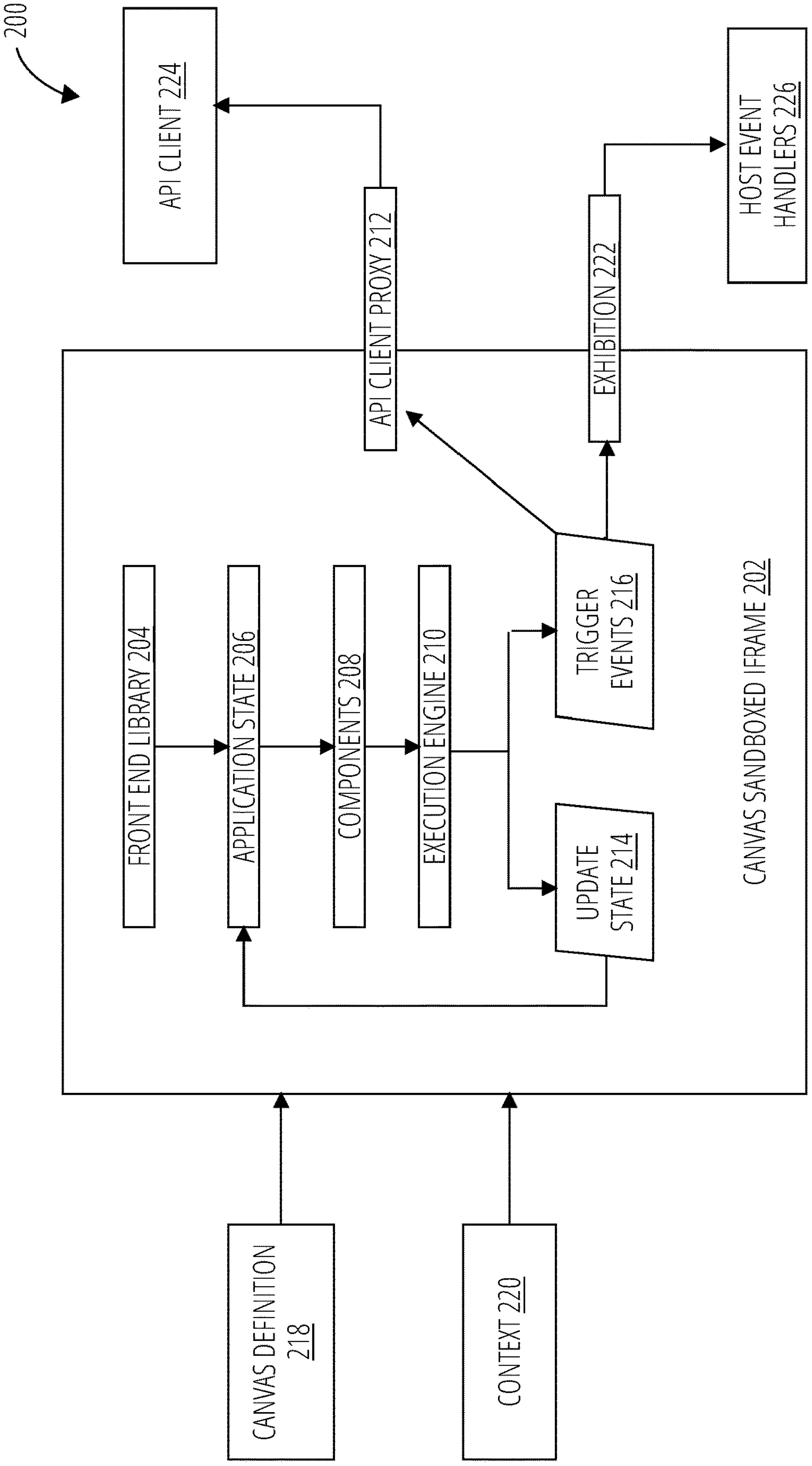
FIG. 2 illustrates a system architecture diagram in accordance with one embodiment.

FIG. 2 illustrates Canvas architecture diagram 200 in accordance with one embodiment.

A system that employs Canvas architecture diagram 200, can allow for running unsecure content in Canvas sandboxed iframe 202, and thus, may allow a user to write, for example, custom logic without compromising the security of a host application that hosts the Canvas sandboxed iframe 202. Such a system architecture can allow a user to write any kind of application using resources that are exposed to the user. Thus, a user does not have any access to any type of entity which would give them direct access to the host application. This can be seen, for example, by the presence of an API Client Proxy 212 and Host Event Handlers 226.

A Context 220 and Canvas Definition 218 are passed into Canvas sandboxed iframe 202, eventually allowing Execution Engine 210 to run underneath, exposing a few items that a user can use, to, for example, affect a state, change components and/or change an application. That is, a user can write their own custom logic/application inside Canvas sandboxed iframe 202—thereby allowing the user to write their own application within a host application. As an example, the system architecture shown in FIG. 2 allows a user to write their own dashboard, or any kind of application that uses data from the host application—without actually accessing proprietary information/data of the host application.

A Canvas Definition 218, along with a Context 220 are input to the Canvas sandboxed iframe 202. A Canvas can be defined as comprising the following elements: a layout definition; Component definitions; State information; Server side expressions; Event handler definitions; and Data source references. As for Context 220, this can include, for example a current status of certain elements within the host application. Context 220 thus allows for passing into Canvas sandboxed iframe 202 an initial state for the application created by the user in Canvas sandboxed iframe 202. As an example, Context 220 can include user preference for a date format, or for example, a colour preference in the application that will be created by the user in Canvas sandboxed iframe 202. Another example can include a situation in which a workbook is currently open; the user-created application can then be launched using the data in the open workbook.

Once a Canvas sandboxed iframe 202 receives a Canvas Definition 218 and a Context 220, a Front End Library 204 is initiated. Front End Library 204 may be used to display components. An example of a Front End Library 204 is React Application. A state of the application is created at 206, while Components 208 render based on the Application State, which can then execute actions in the Execution Engine 210, which triggers events at 216, or updates a state at Update State 214, or both. Where the Front End Library 204 is a React Application, Components 208 can be React Components, while Execution Engine 210 can be a JavaScript Engine is a software engine that executes JavaScript code.

The state can be updated at Update State 214, resulting in recursively returning to the sequence of Application State 206, Components 208 and Execution Engine 210, until eventually landing at Trigger Events 216, which can result in two separate results.

In an instance, there is an API call that is exposed to Canvas sandboxed iframe 202. For example, a method can be called in the host application, which may make a request to a host page where Canvas sandboxed iframe 202 is sitting. That is, a request is made to the host page to run an API request. Once the request is executed, data is returned. Similarly Exhibition 222, which can be an event mechanism, can trigger an event; the host application can decide that it is to host the event and it will perform a subsequent action at Host Event Handlers 226.

Figure 3:
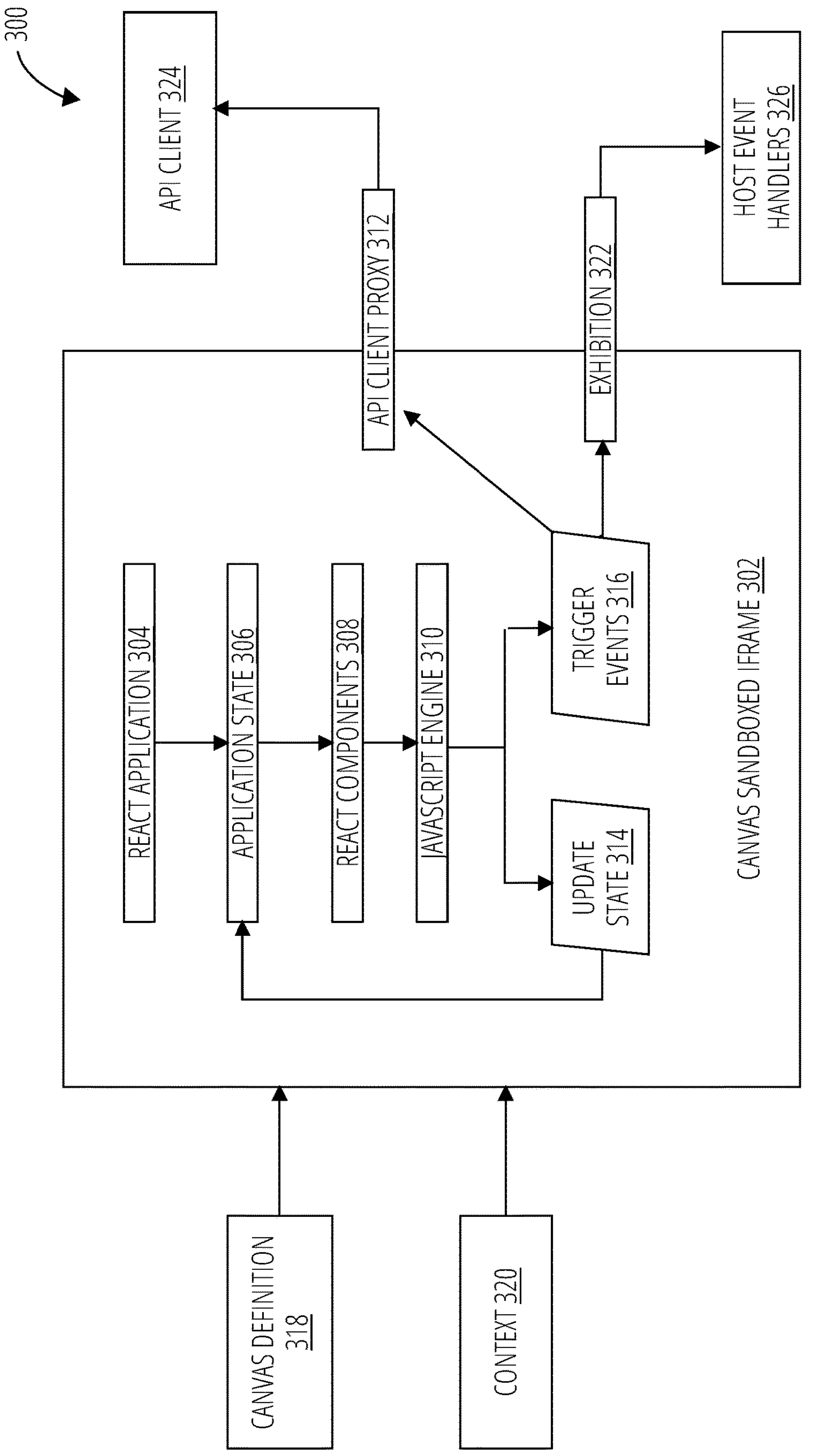
FIG. 3 illustrates a system architecture diagram in accordance with one embodiment.

FIG. 3 illustrates Canvas architecture diagram 300 in accordance with one embodiment. FIG. 3 is similar to FIG. 2, in that React Application 304 is an example of a Front End Library 204; React Components 308 are an example of Components 208, and JavaScript Engine 310 is an example of Execution Engine 210.

Figure 4:
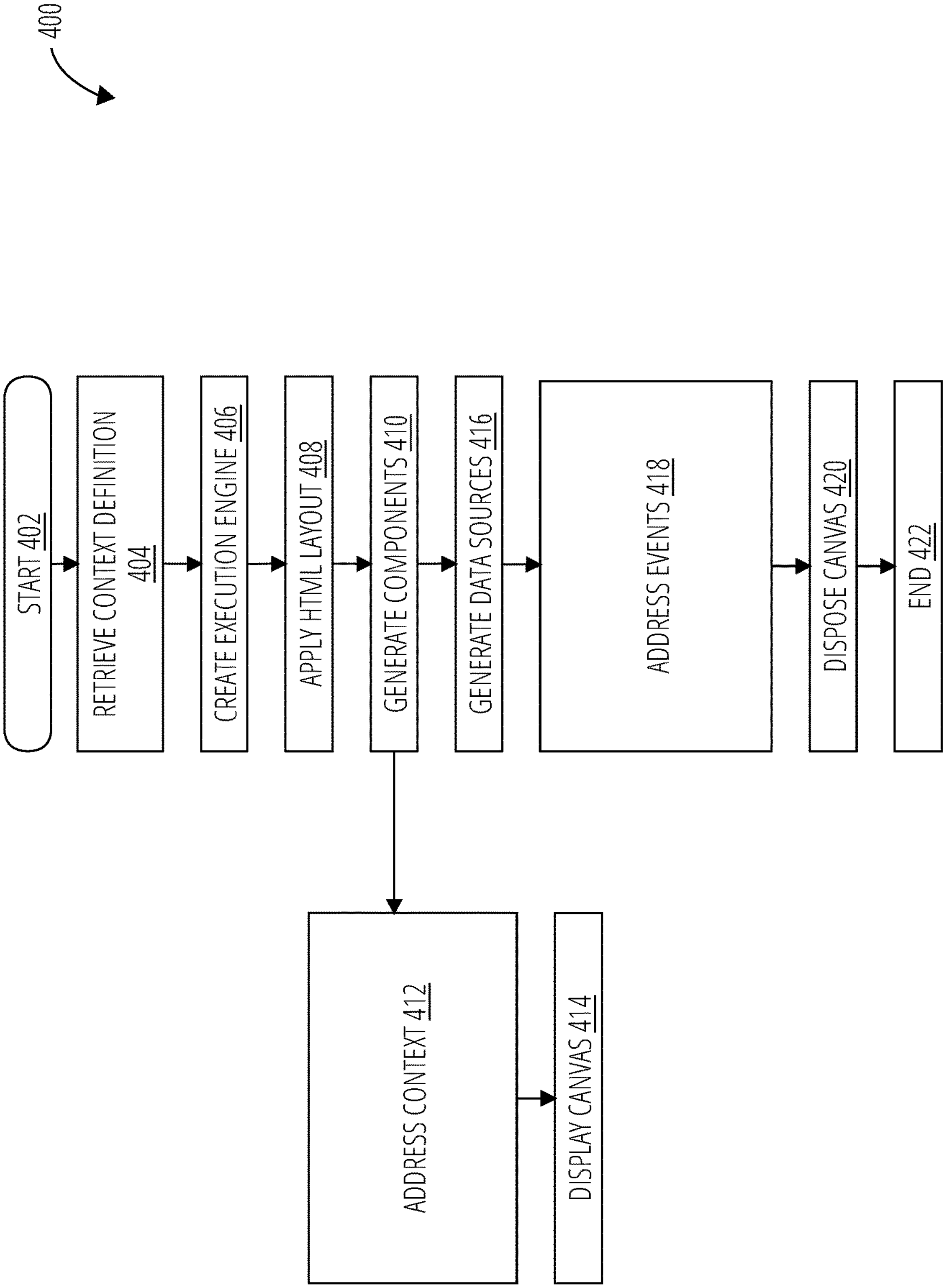
FIG. 4 illustrates a block diagram for execution within a Canvas Sandbox In-line frame (iframe) in accordance with one embodiment.

FIG. 4 illustrates a block diagram 400 for execution within a Canvas Sandbox Iframe in accordance with one embodiment.

Once the process starts at 402, a Canvas Definition 218 may be retrieved at block 404, after which an Execution Engine can be created at block 406. There may be application of an HTML layout at block 408, which can lead to the generation of components at block 410. Context of the components can then be addressed at block 412—that is, Context 220 can be sent as an event into the Canvas, which can then handle Context 220. Subsequently, canvas may be displayed at block 414 according to the Context that was provided, along with any initial state from the Canvas Definition 218. Block 412 is further discussed in FIG. 5.

In addition, once the components are generated at block 410, data sources can be generated at block 416, which provide data to the components. At block 418, events are addressed. This can comprise, for example, any component clicks or any text input into the components. Addressing events at block 418 can modify the state; the components can then re-render. Once a 'close' event is received, the canvas can be disposed at block 420. That is, the canvas exists until the Canvas sandboxed iframe 202 is closed. Disposal comprises steps to clean up the canvas before it is time to stop running. The program ends at block 422. Block 418 is further discussed in FIG. 6.

Figure 5:
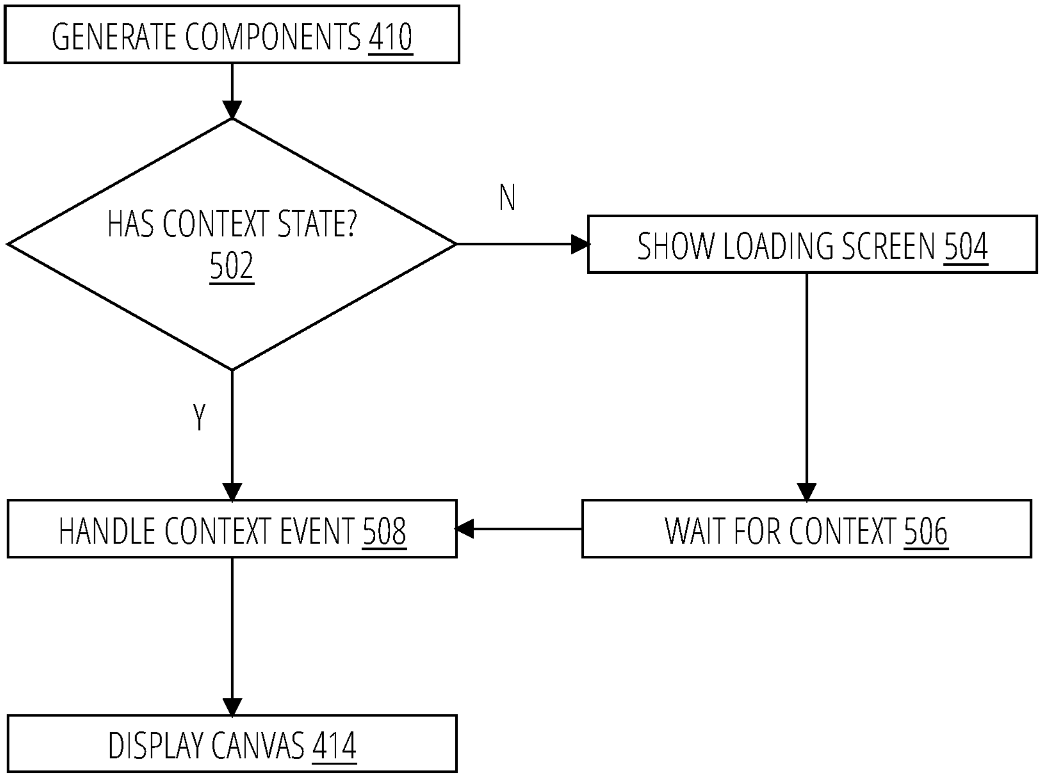
FIG. 5 illustrates a block diagram for addressing Context in the block diagram of FIG. 4, in accordance with one embodiment.

FIG. 5 illustrates a block diagram for addressing Context in the block 412 of FIG. 4, in accordance with one embodiment.

After components are generated at block 410, there is a check to see if there is a Context state (decision block 502). If yes, the context event is handled at block 508, after which the canvas is displayed at block 414.

If there is no Context state, a loading screen is shown at block 504. There is a period to wait for the Context at block 506. Once the Context is loaded into the Canvas sandboxed iframe 202, the Context event is handled at block 508 and the canvas is displayed at block 414.

Figure 6:
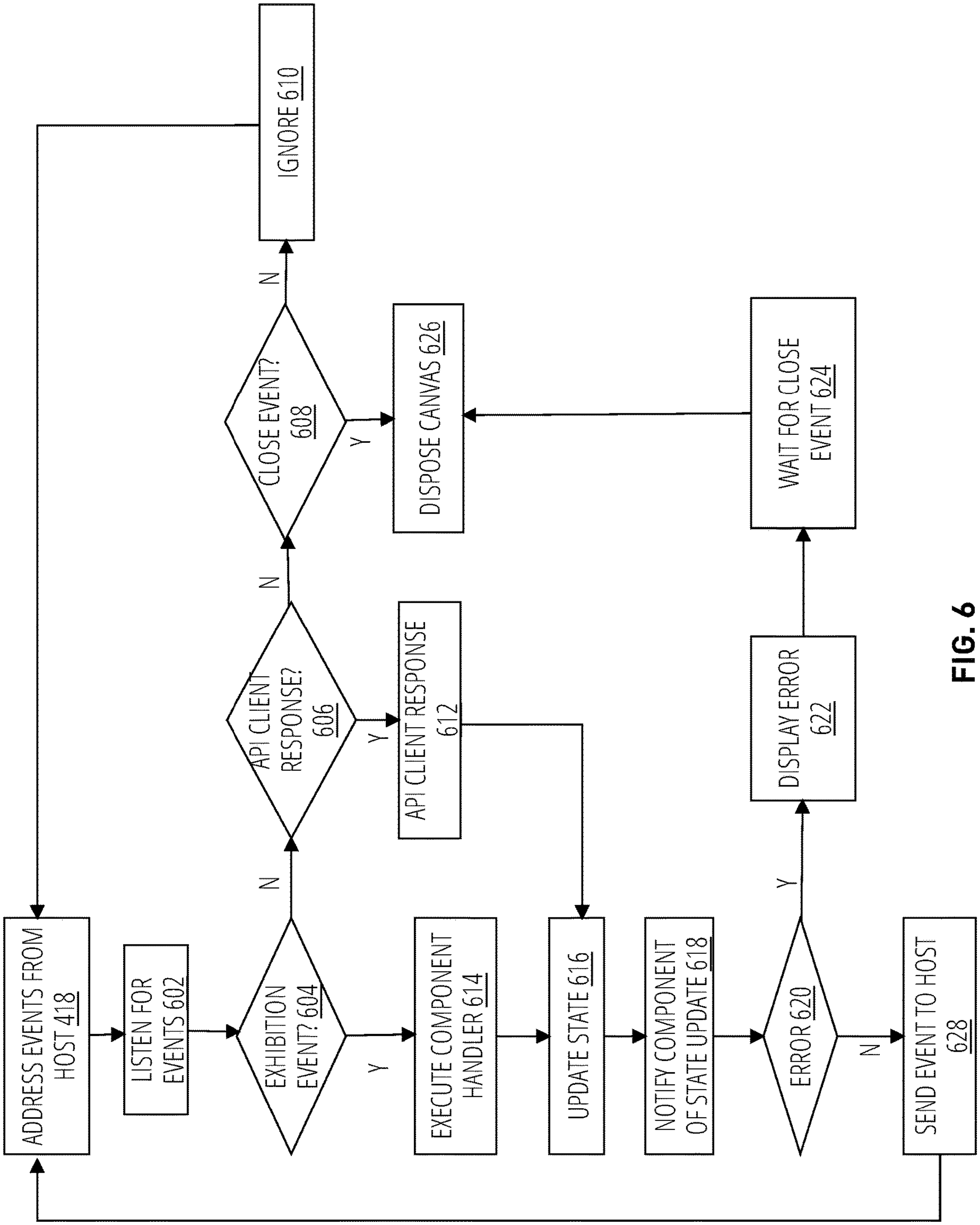
FIG. 6 illustrates a block diagram addressing events in the block diagram of FIG. 4, in accordance with one embodiment.

FIG. 6 illustrates a block diagram addressing events in the block 418 of FIG. 4, in accordance with one embodiment.

After data sources are generated at block 602, the system listens for events at block 602. A different component handler is executed depending on the type of event encountered. In the embodiment shown in FIG. 6, three types of events can be handled: an exhibition event, an API Client response, and a Close event, each of which is discussed below. More or fewer types of events are possible.

For example, if an exhibition event is encountered ('yes' at decision block 604), the corresponding component handler is executed at 614. The state is updated at block 616, followed by notification of all components listening to the state, that the state has been updated, at block 618. Next, there is an analysis for any error at decision block 620. If there is no error 'no' at decision block 620), the event is sent to the host, along with the new state, at block 628. That is, the event, along with the new state, is a new event that is sent to the host to it that the state has been updated. The process returns to block 418 to continue analysis of events from the host, until a close event is eventually encountered.

After listening for events at block 602, if the event is an API client response ('no' at decision block 604 followed by 'yes' at decision block 606), then an API client response is executed at block 612. The state is updated at block 616, followed by notification of all components listening to the state, that the state has been updated, at block 618. Next, there is an analysis for any error at decision block 620. If there is no error 'no' at decision block 620), the event is sent to the host, along with the new state, at block 628. That is, the event, along with the new state, is a new event that is sent to the host to it that the state has been updated. The process returns to block 418 to continue analysis of events from the host, until a close event is eventually encountered.

For either an exhibition event or an API Client response, if there is an error at decision block 620, the error is displayed at block 622, which includes displaying a "close" button. The system waits for a 'close' event (that is, clicking the "close: button) at block 624, after which the canvas is disposed at block 626.

After listening for events at block 602, if the event is a 'close' event ('no' at decision block 604, followed by 'no' at decision block 606, followed by 'yes' at decision block 608), the canvas is then disposed at block 626.

After listening for events at block 602, if the event is neither an exhibition event ('no' at decision block 604), nor an API Client Response ('no' at decision block 606), nor a 'close' event ('yes' at decision block 608), the event is ignored at block 610, and the process returns to block 418 to continue analysis of events from the host.

Figure 7:
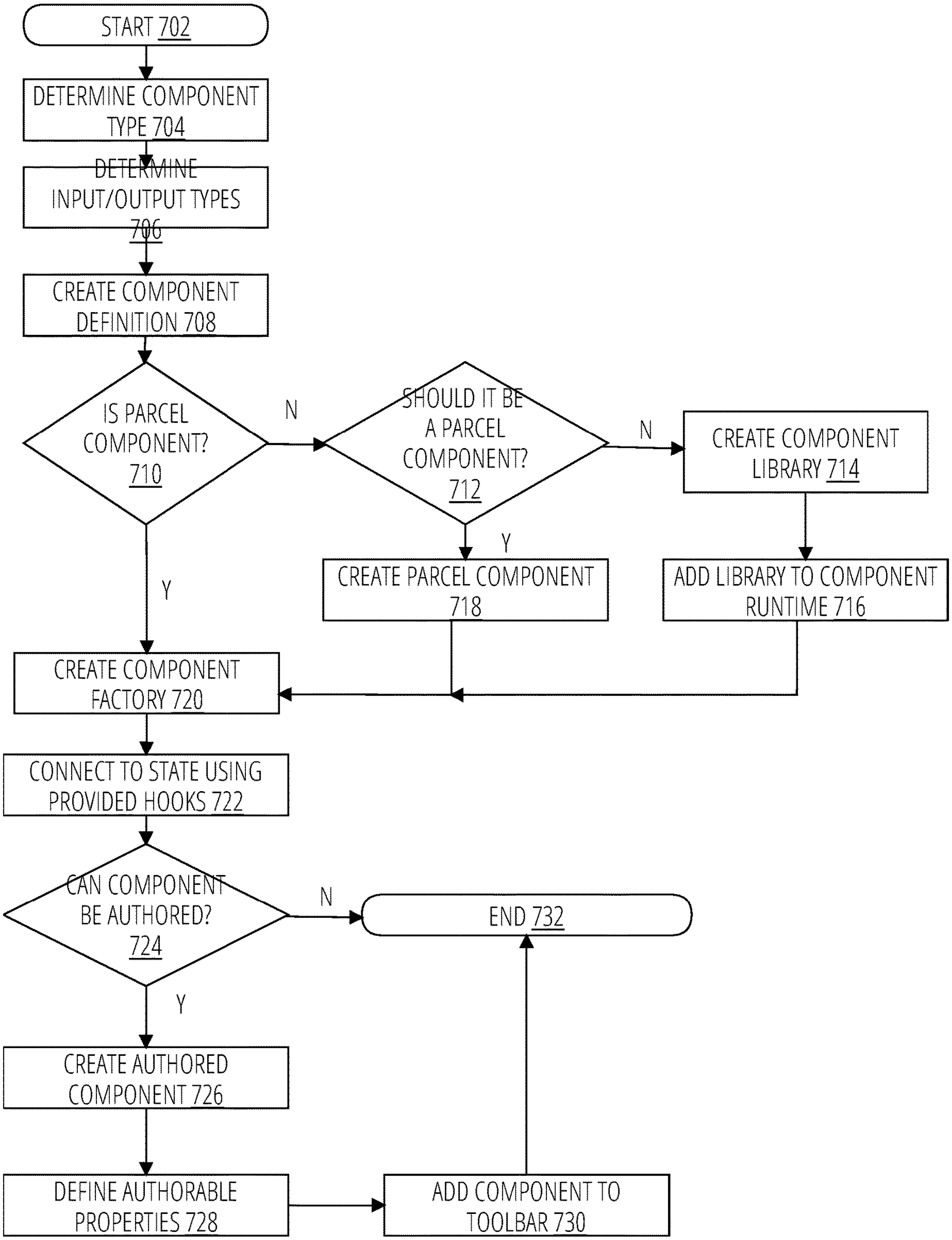
FIG. 7 illustrates a block diagram for adding a new component in accordance with one embodiment.

FIG. 7 illustrates a block diagram for developing and adding a new component, which can be fed into a Canvas Definition (for example Canvas Definition 218 in FIG. 2), in accordance with one embodiment. FIG. 7 provides an embodiment of development work used to develop a new component that can be added to a canvas. Whereas FIG. 2-FIG. 6 illustrate one or more embodiments for running a canvas, FIG. 7 illustrates an embodiment that builds on a canvas infrastructure.

First, the component type is determined at block 704 (for example, a colour-picker). Then the input/output types are determined at block 706 (for example, color, onChange). A component definition is then created at block 708 (for example, typescript type using CanvasField).

A developer then checks to see if it is a parcel component at decision block 710. If it is a parcel component (decision block 710), then a component factory is created at block 720.

If it is not, the developer checks to see if it should be a parcel component at decision block 712. If the answer is yes, then a parcel component is created at block 718, and then a component factory is created at block 720. If, on the other hand, a parcel component should not be created (decision block 712), a component library is created at block 714; the library is added to the component runtime at block 716, and a component factory is created at block 720.

Following creation of the component factory at block 720, the developer connects to state using provided hooks at block 722. The developer then checks to see if the component can be authored at decision block 724. If not, the process ends at 732. If yes, then there is additional work in the web client in order to add that to authoring: the authored component is created at block 726, and authorable properties are defined at block 728. The component is then added to a toolbar at block 730, after which, the process ends at 732.

In summary, FIG. 7 provides an embodiment for adding a new component to a canvas, while working on the canvas. If, the new type of component to be added is a radio button, for example, then at block 704, the component type is determined as a radio button. The properties of the radio button are determined, including its input/output types at block 706, followed by creation of a definition of the radio button at decision block 608. Then the various decision blocks and steps are followed from decision block 710 through block 730.

In summary, FIG. 7 illustrates an embodiment of a process which is executed when a new component (for a canvas) is requested. Once the new component is developed, it can be added to the canvas environment for further use. An end user can then access the new component by adding it to Canvas Definition 218 or Canvas Definition 318.

While this specification contains many specific implementation details, these should not be construed as limitations on the scope of what may be claimed, but rather as descriptions of features that may be specific to particular embodiments. Certain features that are described in this specification in the Context of separate embodiments can also be implemented in combination in a single embodiment. Conversely, various features that are described in the Context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:

retrieving, by a processor, a definition of a context;

creating, by the processor, an execution engine that executes within a canvas sandboxed iframe hosted by a host application;

applying, by the processor, an HTML layout;

generating, by the processor, one or more components;

addressing, by the processor, the context;

displaying, by the processor, a canvas via the canvas sandboxed Iframe;

generating, by the processor, one or more data sources;

addressing, by the processor, one or more events from a host via an API Client Proxy and Host Event Handlers over an event bus that does not give direct access to the host application;

disposing, by the processor, the canvas by closing the canvas sandboxed iframe and cleaning up the canvas.

2. The computer-implemented method of claim 1, wherein the canvas comprises:

a layout definition;

one or more component definitions;

state information;

one or more server side expressions;

one or more event handler definitions; and one or more data source references.

3. The computer-implemented method of claim 1, wherein:

the execution engine is a JavaScript Engine; and the one or more components are React Components.

4. The computer-implemented method of claim 1, wherein addressing the context comprises handling, by the processor, a context event associated with the context.

5. The computer-implemented method of claim 1, wherein the one or more events is:

an exhibition event, an API-Client response, or a close event.

6. The computer-implemented method of claim 5, wherein the one or more events is the exhibition event, and addressing the one or more events comprises:

executing, by the processor, a component handler for the exhibition event;

updating, by the processor, a state;

notifying, by the processor, each component listening to the state that the state has been updated;

where there is no error, sending, by the processor, the exhibition event and the updated state to the host; and where there is an error, disposing, by the processor, the canvas.

7. The computer-implemented method of claim 5, wherein the one or more events is the API Client Response, and addressing the one or more events comprises:

updating, by the processor, a state;

notifying, by the processor, each component listening to the state that the state has been updated;

where there is no error, sending, by the processor, the exhibition event and the updated state to the host; and where there is an error, disposing, by the processor, the canvas.

8. The computer-implemented method of claim 5, wherein the one or more events is the close event, and addressing the one or more events comprises:

disposing, by the processor, the canvas.

9. A computing apparatus comprising:

a processor; and a memory storing instructions that, when executed by the processor, configure the apparatus to:

retrieve, by the processor, a definition of a context;

create, by the processor, an execution engine that executes within a canvas sandboxed Iframe hosted by a host application;

apply, by the processor, an HTML layout;

generate, by the processor, one or more components;

address, by the processor, the context;

display, by the processor, a canvas via the canvas sandboxed iframe;

generate, by the processor, one or more data sources;

address, by the processor, one or more events from a host via an API Client Proxy and Host Event Handlers over an event bus that does not give direct access to the host application; and dispose, by the processor, the canvas by closing the canvas sandboxed Iframe and cleaning up the canvas.

10. The computing apparatus of claim 9, wherein the canvas comprises:

a layout definition;

one or more component definitions;

state information;

one or more server-side expressions;

one or more event handler definitions; and one or more data source references.

11. The computing apparatus of claim 9, wherein:

the execution engine is a JavaScript Engine; and the one or more components are React Components.

12. The computing apparatus of claim 9, wherein addressing the context comprises handling, by the processor, a context event associated with the context.

13. The computing apparatus of claim 9, wherein the one or more events is:

an exhibition event, an API-Client response, or a close event.

14. The computing apparatus of claim 13, wherein the one or more events is the exhibition event, and when addressing the one or more events, the apparatus is further configured to:

execute, by the processor, a component handler for the exhibition event;

update, by the processor, a state;

notify, by the processor, each component listening to the state that the state has been updated;

where there is no error, send, by the processor, the exhibition event and the updated state to the host; and where there is an error, dispose, by the processor, the canvas.

15. The computing apparatus of claim 13, wherein the one or more events is the API Client Response, and when addressing the one or more events, the apparatus is further configured to:

update, by the processor, a state;

notify, by the processor, each component listening to the state that the state has been updated;

where there is no error, send, by the processor, the exhibition event and the updated state to the host; and where there is an error, dispose, by the processor, the canvas.

16. The computing apparatus of claim 13, wherein the one or more events is the close event, and when addressing the one or more events, the apparatus is further configured to:

dispose, by the processor, the canvas.

17. A non-transitory computer-readable storage medium, the computer-readable storage medium including instructions that when executed by a computer, cause the computer to:

retrieve, by a processor, a definition of a context;

create, by the processor, an execution engine that executes within a canvas sandboxed iframe hosted by a host application;

apply, by the processor, an HTML layout;

generate, by the processor, one or more components;

address, by the processor, the context;

display, by the processor, a canvas via the canvas sandboxed iframe;

generate, by the processor, one or more data sources;

address, by the processor, one or more events from a host via an API Client Proxy and Host Event Handlers over an event bus that does not give direct access to the host application; and dispose, by the processor, the canvas by closing the canvas sandboxed Iframe and cleaning up the canvas.

18. The non-transitory computer-readable storage medium of claim 17, wherein the canvas comprises:

a layout definition;

one or more component definitions;

state information;

one or more server-side expressions;

one or more event handler definitions; and one or more data source references.

19. The non-transitory computer-readable storage medium of claim 17, wherein:

the execution engine is a JavaScript Engine; and the one or more components are React Components.

20. The non-transitory computer-readable storage medium of claim 17, wherein addressing the context comprises:

handle, by the processor, a context event associated with the context.

21. The computer-readable storage medium of claim 17, wherein the one or more events is:

an exhibition event, an API Client Response, or a close event.

22. The computer-readable storage medium of claim 21, wherein the one or more events is the exhibition event, and when addressing the one or more events, the computer-readable storage medium including instructions that when executed by the computer, further cause the computer to:

execute, by the processor, a component handler for the exhibition event;

update, by the processor, a state;

notify, by the processor, each component listening to the state that the state has been updated;

where there is no error, send, by the processor, the exhibition event and the updated state to the host; and where there is an error, dispose, by the processor, the canvas.

23. The computer-readable storage medium of claim 21, wherein the one or more events is the API Client Response, and when addressing the one or more events, the computer-readable storage medium including instructions that when executed by the computer, further cause the computer to:

update, by the processor, a state;

notify, by the processor, each component listening to the state that the state has been updated;

where there is no error, send, by the processor, the exhibition event and the updated state to the host; and where there is an error, dispose, by the processor, the canvas.

24. The computer-readable storage medium of claim 21, wherein the one or more events is the close event, and when addressing the one or more events, the computer-readable storage medium including instructions that when executed by the computer, further cause the computer to:

dispose, by the processor, the canvas.

* * * * *